US008732998B2

United States Patent
Kitayama

(10) Patent No.: US 8,732,998 B2
(45) Date of Patent: May 27, 2014

(54) EXTERIOR SIGN

(75) Inventor: Keiichi Kitayama, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 238 days.

(21) Appl. No.: 13/298,038

(22) Filed: Nov. 16, 2011

(65) Prior Publication Data

US 2012/0124875 A1     May 24, 2012

(30) Foreign Application Priority Data

Nov. 18, 2010    (JP) ................................ 2010-257833

(51) Int. Cl.
     *G09F 21/04*      (2006.01)
(52) U.S. Cl.
     CPC ................................. *G09F 21/048* (2013.01)
     USPC ............................................. 40/591; 40/615
(58) Field of Classification Search
     CPC .................................................. G09F 21/048
     USPC ................... 40/578, 591, 615; 296/1.07, 1.08
     See application file for complete search history.

(56) References Cited

U.S. PATENT DOCUMENTS

| 4,556,588 | A | * | 12/1985 | Rockwood ..................... 428/13 |
| 5,580,643 | A | * | 12/1996 | Kennedy et al. ............... 428/212 |
| 6,015,613 | A | * | 1/2000 | Kinlen et al. .................. 428/332 |
| 6,103,390 | A | | 8/2000 | Kamiya |
| 6,328,358 | B1 | | 12/2001 | Berweiler |
| 6,986,918 | B2 | * | 1/2006 | Jacobs ............................ 428/14 |
| 2004/0113899 | A1 | | 6/2004 | Nakayama |
| 2005/0058537 | A1 | * | 3/2005 | Corman et al. ................ 415/139 |
| 2007/0109206 | A1 | | 5/2007 | Fujii |

FOREIGN PATENT DOCUMENTS

| EP | 1342589 A1 | 9/2003 |
| JP | 2005-020769 | 1/2005 |
| JP | 2009-160743 | 7/2009 |

* cited by examiner

*Primary Examiner* — Joanne Silbermann
(74) *Attorney, Agent, or Firm* — James R. Gourley; Colin P. Cahoon; Carstens & Cahoon, LLP

(57) ABSTRACT

An exterior sign includes a main body, which has a design, a plating material, which is arranged on an inner surface of the main body, wherein the plating material is visible through the main body, and a double-layered protective layer, which is arranged on the plating material. The double-layered protective layer includes a first protective layer and a second protective layer. The first protective layer is arranged closer to the plating material than the second protective layer and has a lower level of contractility during curing than the second protective layer. The second protective layer has a higher level of corrosion resistance than the first protective layer.

4 Claims, 5 Drawing Sheets

Fig.6A
Fig.6B
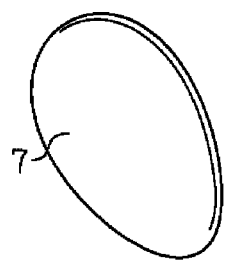
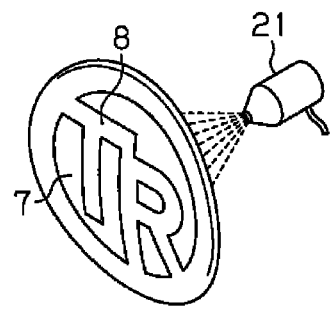
Fig.6C  Fig.6D  Fig.6E
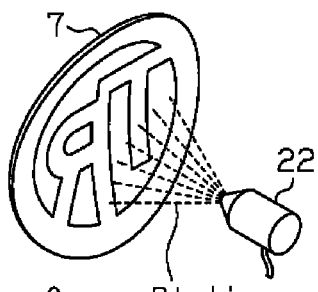 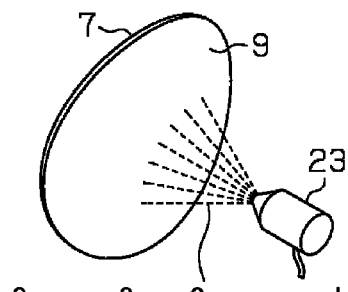 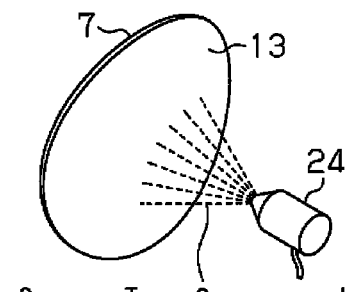
Spray Plating Material   Spray One-Component Curing Material   Spray Two-Component Curing Material
Fig.7
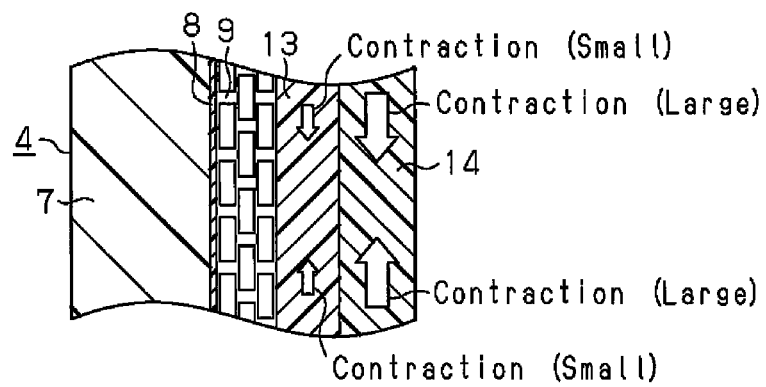

Fig. 8

| Application Conditions | Plating Layer | | One-Component Curing Protective Layer | | Two-Component Curing Protective Layer | | Evaluation (◎:Good ○:Satisfactory △:NG ×:Poor) | | | | | |
|---|---|---|---|---|---|---|---|---|---|---|---|---|
| | | | | | | | Corrosion Resistance | | Appearance | | | |
| | Material | Thickness (μm) | Material | Thickness (μm) | Material | Thickness (μm) | Water Resistance (240hr) | Water Resistance (360hr) | Brightness | Uneven Color | Sideward Bleeding | |
| One-Component Curing Protective Layer | High Brightness AL Back | <1 | Acrylic Silicone | 10 | | | △ | × | ◎ | ◎ | ◎ | |
| | High Brightness AL Back | <1 | Acrylic Silicone | 20 | | | ○ | △ | ◎ | ◎ | ◎ | |
| | High Brightness AL Back | <1 | Acrylic Silicone | 30 | | | ○ | △ | ○ | ○ | ○ | |
| Two-Component Curing Protective Layer | High Brightness AL Back | <1 | | | Acrylic Urethane | 10 | — | — | × | × | × | |
| | High Brightness AL Back | <1 | | | Acrylic Urethane | 20 | — | — | × | × | × | |
| | High Brightness AL Back | <1 | | | Acrylic Urethane | 40 | — | — | × | × | × | |
| Double-Layered Protective Layer | High Brightness AL Back | <1 | Acrylic Silicone | 10 | Acrylic Urethane | 10 | ○ | △ | ◎ | ◎ | ◎ | |
| | High Brightness AL Back | <1 | Acrylic Silicone | 10 | Acrylic Urethane | 20 | ◎ | ◎ | ◎ | ○ | ◎ | |
| | High Brightness AL Back | <1 | Acrylic Silicone | 10 | Acrylic Urethane | 40 | ◎ | ○ | △ | △ | ○ | |
| | High Brightness AL Back | <1 | Acrylic Silicone | 20 | Acrylic Urethane | 10 | ◎ | ◎ | ◎ | ◎ | ◎ | ← Optimal Combination |
| | High Brightness AL Back | <1 | Acrylic Silicone | 20 | Acrylic Urethane | 20 | ◎ | ◎ | ◎ | ◎ | ◎ | |
| | High Brightness AL Back | <1 | Acrylic Silicone | 20 | Acrylic Urethane | 40 | ◎ | ○ | ○ | ○ | ◎ | |
| | High Brightness AL Back | <1 | Acrylic Silicone | 30 | Acrylic Urethane | 10 | ◎ | ◎ | ○ | ◎ | ○ | |
| | High Brightness AL Back | <1 | Acrylic Silicone | 30 | Acrylic Urethane | 20 | ◎ | ◎ | ○ | ○ | ○ | |
| | High Brightness AL Back | <1 | Acrylic Silicone | 30 | Acrylic Urethane | 40 | ◎ | ◎ | ○ | ○ | ○ | |

EXTERIOR SIGN

CROSS-REFERENCE TO RELATED APPLICATIONS

This application is based upon and claims the benefit of priority from prior Japanese Patent Application No. 2010-257833, filed on Nov. 18, 2010, the entire contents of which are incorporated herein by reference.

BACKGROUND OF THE INVENTION

The present invention relates to an exterior sign such as an emblem.

In the prior art, as shown in FIG. 1, an exterior sign 81 is attached to a vehicle as an emblem that identifies a vehicle manufacturer or a vehicle model. The exterior sign 81 includes a main body 82, which shows a symbol or a mark. The main body 82 is fixed by an adhesive member 83, such as a double-sided adhesive tape, to an attachment location 84 on a vehicle body. The main body 82 includes a transparent piece 85 as a base material of the main body 82. An ornamental plating layer 86 is applied to an inner surface of the transparent piece 85. The ornamental plating layer 86 is visible through the transparent piece 85 and shows a plated design.

When the ornamental plating layer 86 is continuously exposed to a fluid such as rainwater or a washing agent used during a carwash. This may erode or discolor the ornamental plating layer 86. To prevent such a problem, as shown in FIG. 2, a protective layer 87 may be applied to the ornamental plating layer 86. This protects the ornamental plating layer 86 from corrosion (refer to, for example, Japanese Laid-Open Patent Publication No. 2005-20769, paragraph 16).

The protective layer 87 may be formed, for example, from a one-component curing material, which is a resin material manufactured by simply mixing a base compound and a solvent. However, the desired level of corrosion resistance cannot be obtained with just the one-component curing material. Thus, when using the one-component curing material, the protective layer 87 is required to be thick. However, when the one-component curing material of the protective layer 87 is thick, components in the protective layer undergo intense contraction during curing, and the solvent of the one-component curing material may erode the ornamental plating layer 86. This disturbs the arrangement of metal atoms in the ornamental plating layer 86, lowers the brightness of the ornamental plating layer 86, and adversely affects the outer appearance.

A two-component curing material, which has a higher level of corrosion resistance than a one-component curing material, may be used for the protective layer 87. A two-component curing material is a resin material manufactured by heating a mixture of a base compound and a curing agent. However, in a two-component curing material, curing occurs when the base compound reacts with the curing agent. Thus, contraction during curing becomes more intense than a one-component curing material. This further disturbs the arrangement of metal atoms in the ornamental plating layer 86. Thus, the ornamental plating layer 86 still cannot obtain sufficient brightness.

SUMMARY OF THE INVENTION

It is an object of the present invention to provide an exterior sign including a plating material that resists corrosion while maintaining an aesthetic appeal.

One aspect of the present invention is an exterior sign provided with a main body including a design. A plating material is arranged on an inner surface of the main body. The plating material is visible through the main body. A double-layered protective layer is arranged on the plating material. The double-layered protective layer includes a first protective layer and a second protective layer. The first protective layer is arranged closer to the plating material than the second protective layer and has a lower level of contractility during curing than the second protective layer. The second protective layer has a higher level of corrosion resistance than the first protective layer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 6A to 6E are diagrams illustrating the procedures for manufacturing an emblem body of the shown in FIG. 3;

FIG. 7 is a diagram illustrating how two protective layers function; and

FIG. 8 is a table showing the evaluation of different types of protective layer materials.

DETAILED DESCRIPTION OF THE INVENTION

An exterior sign according to one embodiment of the present invention will now be described with reference to FIGS. 3 to 8.

Figure 1:
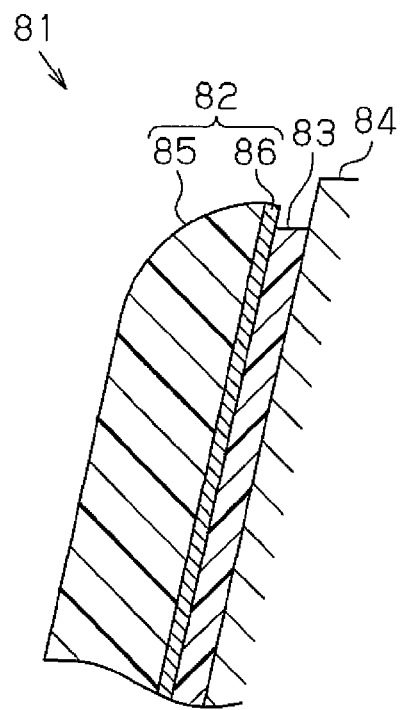
FIG. 1 is a partial cross-sectional view of an exterior sign (exterior emblem) in the prior art.
Figure 2:
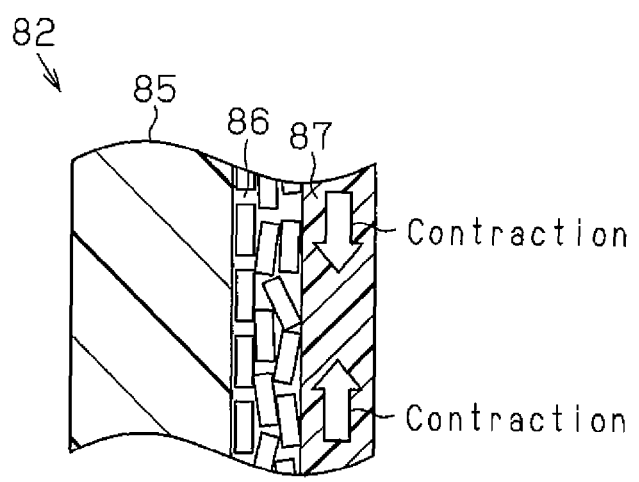
FIG. 2 is a diagram illustrating a phenomenon that occurs in the protective layer of FIG. 1.
Figure 3:
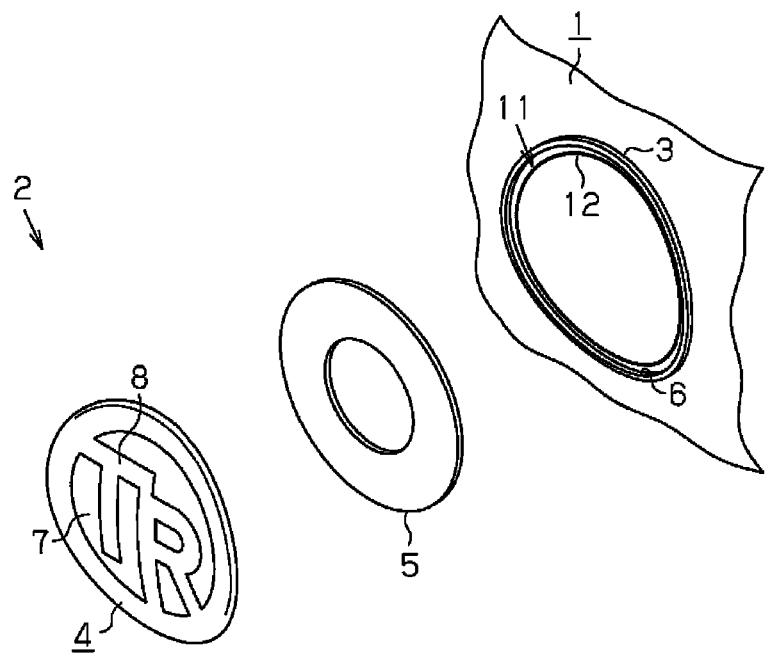
FIG. 3 is an exploded perspective view showing an exterior sign (exterior emblem) according to one embodiment.

FIG. 3 shows a vehicle body 1 and an exterior emblem 2 (exterior automobile emblem), which is attached to the vehicle body 1. The exterior emblem 2, which corresponds to an external sign, is a symbol or a mark that identifies a vehicle manufacturer or a vehicle model.

Figure 4:
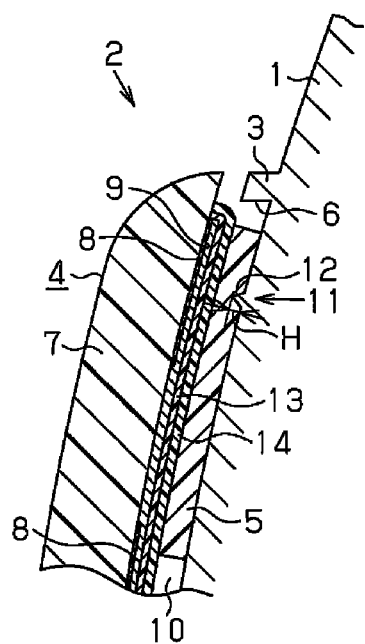
FIG. 4 is a partial cross-sectional view of the exterior emblem shown in FIG. 3.

As shown in FIGS. 3 and 4, the vehicle body 1 includes a seat 3. An emblem body 4 of the exterior emblem 2 is fixed by an adhesive member 5, such as a double-sided adhesive tape, to the seat 3. The emblem body 4 is generally disk-shaped and serves as a main body of the exterior emblem 2. The seat 3 is stepped to include a circular cavity. For example, a step 6 extends along the periphery of the seat 3 to hold the emblem body 4 in position. The seat 3 is one example of an attachment location, and the emblem body 4 is one example of the main body of an exterior sign.

The adhesive member 5 is a flat annular sheet and has a closed pore structure including independent pores, or cells. The adhesive member 5 is formed from a highly viscoelastic material. Viscoelasticity is the property of materials that exhibits both viscosity, which is a property that acts to hold the deformation speed at zero, and elasticity, which is a property that acts to return to an original state after deformation.

A transparent piece 7 is used as a base material of the emblem body 4. The transparent piece 7 is formed from, for example, an acrylic. For example, a colored paint is applied partially to an inner surface of the transparent piece 7 to form an emblem layer 8 that shows a design, such as a symbol or a mark.

An ornamental plating layer 9 is applied to the inner surface of the emblem body 4 to improve the outer appearance of the exterior emblem 2. The ornamental plating layer 9 is formed from, for example, aluminum and arranged entirely on the inner surface of the transparent piece 7 including the emblem layer 8. The ornamental plating layer 9 is visible from the outer side at locations excluding the emblem layer 8 and thereby improves the aesthetic appeal of the exterior emblem 2. The ornamental plating layer 9 has a thickness of, for example, less than one micrometer. The ornamental plating layer 9 is one example of a plating material.

In the present example, a waterproof structure 11 is arranged between the seat 3 and the emblem body 4. The waterproof structure 11 prevents fluid from entering a gap 10 formed between the emblem body 4 and the seat 3. As one example of the waterproof structure 11, an annular wall 12 is formed in the seat 3 extending along the peripheral portion of the emblem body 4. The wall 12 may be a protrusion, such as a mound formed through welding. In the present example, the wall 12 has a triangular cross-section. The wall 12 has a height H that is set to be approximately one third the thickness of the adhesive member 5. With the waterproof structure 11, when the emblem body 4 is attached by the adhesive member 5 to the seat 3, the wall 12 bites into the adhesive member 5 so that the peripheral portion of the adhesive member 5 is entirely held under pressure between the emblem body 4 and the seat 3. This seals the gap 10.

Figure 5:
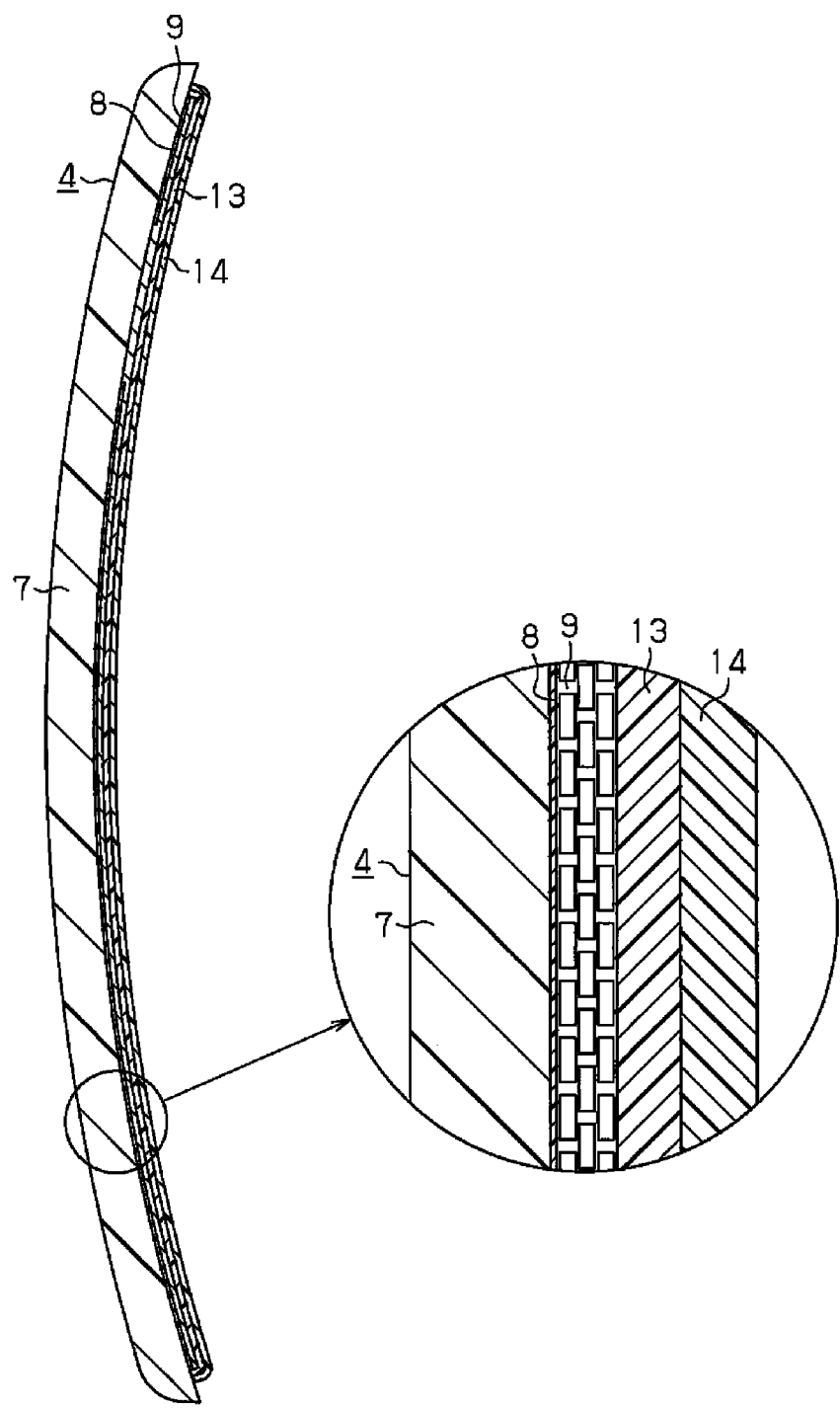
FIG. 5 is a cross-sectional view and a partially enlarged cross-sectional view of the exterior emblem shown in FIG. 3.

As shown in FIG. 5, two protective layers 13 and 14 are applied entirely to the ornamental plating layer 9 so that the ornamental plating layer 9 is resistant to corrosion and maintains the aesthetic appeal. In detail, a one-component curing material is applied to the ornamental plating layer 9 to form the protective layer 13, which will hereafter be referred to as the one-component curing protective layer 13. The one-component curing material is a resin material cured by simply mixing a base compound and a solvent. An acrylic silicone, for example, is used as the one-component curing material in this example. A volatile solvent, for example, is used as the solvent. The one-component curing protective layer 13 is one example of a first protective layer.

A two-component curing material is applied entirely to an inner surface of the one-component curing protective layer 14 to form the second protective layer 14, which will hereafter be referred to as the two-component curing protective layer 14. A two-component curing material is a resin material of a mixture of a base compound, a curing agent, and a solvent and cured when the mixture is heated and a reaction occurs. An acrylic urethane, for example, is used as the two-component curing material in this example. A volatile solvent, for example, is used as the solvent. The two-component curing protective layer 14 is an example of a second protective layer.

The one-component curing protective layer 13 of the present example functions as a buffer that protects the ornamental plating layer 9 from the two-component curing protective layer 14. Thus, the one-component curing protective layer 13 does not have to be thick and only needs a certain thickness. In the present example, the one-component curing protective layer 13 has a thickness of, for example, 10 to 30 micrometers. Further, the one-component curing protective layer 13 has a lower contractility than the two-component curing protective layer 14. Thus, the contraction of the one-component curing protective layer 13 is small during curing. Further, since the one-component curing protective layer 13 is thin, the contraction of the one-component curing protective layer 13 during curing is extremely small. In other words, the one-component curing protective layer 13 contracts less than the two-component curing protective layer 14. As a result, even though the one-component curing protective layer 13 is applied to the ornamental plating layer 9, the one-component curing protective layer 13 does not disturb the arrangement of metal atoms and resists erosion.

The two-component curing protective layer 14 is thick enough to maintain sufficient corrosion resistance for the ornamental plating layer 9. In this example, the two-component curing protective layer 14 has a thickness of, for example, 20 to 30 micrometers. The two-component curing protective layer 14 has a property in which it greatly contracts when cured. However, in the present example, the one-component curing protective layer 13 functions as a buffer. Thus, the contraction of the two-component curing protective layer 14 during curing does not affect the ornamental plating layer 9. Further, the two-component curing protective layer 14 has a higher level of corrosion resistance than the one-component curing protective layer 13.

A process for manufacturing the exterior emblem 2 will now be described with reference to FIGS. 6 to 8.

Referring to FIG. 6A, the transparent piece 7 is first prepared as a base material for the emblem body 4. Then, referring to FIG. 6B, a colored paint is applied to the inner surface of the transparent piece 7 from an emblem printing nozzle 21 to form the emblem layer 8. The emblem layer 8 forms a symbol or mark on parts of the inner surface of the transparent piece 7. Thus, when the emblem body 4 is viewed from the outer side, the emblem layer 8 appears as the symbol or mark of the emblem body 4.

Referring to FIG. 6C, a liquid plating material (e.g., aluminum) is applied entirely to the inner surface of the emblem body 4 from a plating material application nozzle 22 to form the ornamental plating layer 9 entirely on the inner surface of the transparent piece 7. The ornamental plating layer 9, which is applied to the inner surface of the transparent piece 7, is solidified in a state in which metal atoms are regularly arranged and adhered to the inner surface of the transparent piece 7.

Then, as shown in FIG. 6D, a one-component curing material is sprayed entirely on the ornamental plating layer 9 from a one-component curing material application nozzle 23. The one-component curing material is cured under normal temperatures to form the one-component curing protective layer 13 entirely on the ornamental plating layer 9. The one-component curing protective layer 13 is thin and has a thickness of, for example, 10 to 30 micrometers.

The one-component curing protective layer 13 is extremely thin. Thus, referring to FIG. 7, the contraction of the one-component curing protective layer 13 during curing is small, and the one-component curing protective layer 13 does not affect the corrosion resistance of the ornamental plating layer 9. Further, the arrangement of metal atoms is not disturbed in the ornamental plating layer 9. Thus, even though the protective layer 13 is arranged on the ornamental plating layer 9, the outer appearance of the ornamental plating layer 9 is not affected.

Referring to FIG. 6E, a two-component curing material is sprayed entirely to the one-component curing protective layer 13 from a two-component curing material application nozzle 24. The two-component curing material is heated and cured to form the two-component curing protective layer 14 entirely on the one-component curing protective layer 13. The two-component curing protective layer 14 has a thickness of, for example, 20 to 30 micrometers to obtain sufficient corrosion resistance.

The two-component curing protective layer 14 is applied to the ornamental plating layer 9 with the one-component curing protective layer 13 arranged in between. Thus, the one-component curing protective layer 13 functions as a buffer when the two-component curing protective layer 14 is arranged on the emblem body 4. Even though the two-component curing protective layer 14 is used as a protective layer for the ornamental plating layer 9, the one-component curing protective layer 13 blocks the relatively large contraction of the two-component curing protective layer 14. Further, the contraction of the two-component curing protective layer 14 does not affect the ornamental plating layer 9. Thus, the arrangement of metal atoms in the ornamental plating layer 9 is not disturbed, and the appearance of the ornamental plating layer 9 is not affected.

FIG. 8 is a table showing the evaluation of different types of protective layer materials. As apparent from FIG. 8, the most superior properties were obtained when the one-component curing protective layer 13 had a thickness of 20 micrometers and the two-component curing protective layer 14 had a thickness of 20 micrometers. Further, when the one-component curing protective layer 13 has a thickness of 10 to 30 micrometers and the two-component curing protective layer 14 has a thickness of 20 to 30 micrometers, such a combination obtains a final product having sufficient properties.

As described above, in the present example, the protective layer for the ornamental plating layer 9 has a double-layered structure including the one-component curing protective layer 13 and the two-component curing protective layer 14. Here, the protective layer that contacts the ornamental plating layer 9 is the one-component curing protective layer 13. The amount of contraction in the one-component curing protective layer 13 is small during curing. Thus, the one-component curing protective layer 13 does not disturb the metal atom arrangement of the ornamental plating layer 9. Further, the two-component curing protective layer 14, which effectively maintains the corrosion resistance of the ornamental plating layer 9, is applied to the ornamental plating layer 9 using the one-component curing protective layer 14 as a buffer. Thus, even though the amount of contraction in the two-component curing protective layer 14 is large during curing, the one-component curing protective layer 13 blocks the contraction. This prevents the contraction from affecting the ornamental plating layer 9. As a result, even though the two-component curing protective layer 14 is used as a protective layer of the ornamental plating layer 9, the metal atom arrangement of the ornamental plating layer 9 is not affected by the two-component curing protective layer 14. Accordingly, the ornamental plating layer 9 resists corrosion while maintaining an aesthetic appeal.

Further, the waterproof wall 12 is arranged between the emblem body 4 and the seat 3 extending along the peripheral portion of the seat 3. When the emblem body 4 is attached by the adhesive member 5 to the seat 3, the wall 12 holds the adhesive member 5 under pressure between the emblem body 4 and the seat 3. This seals the gap 10. Thus, even when fluid enters the surrounding of the emblem body 4, the fluid is prevented from coming into contact with the ornamental plating layer 9 through the gap 10. This prevents erosion and discoloring of the ornamental plating layer 9.

The exterior sign of the present embodiment has the advantages described below.

a. The protective layer applied to the ornamental plating layer 9 has a double-layered structure and includes the one-component curing protective layer 13 and the two-component curing protective layer 14. The one-component curing protective layer 13, which contacts the ornamental plating layer 9, has a relatively low level of contractility and functions as a buffer that protects the ornamental plating layer 9 from the two-component curing protective layer 14. Thus, the ornamental plating layer 9 resists corrosion while maintaining an aesthetic appeal.

b. A one-component curing material has a relatively low level of contractility and a certain level of corrosion resistance, and a two-component curing material has a relatively high level of corrosion resistance. In the present example, the one-component curing protective layer 13 and the two-component curing protective layer 14 are used as the protective layer. Thus, the properties of the one-component curing material and the two-component curing material are effectively used so that the ornamental plating layer 9 resists corrosion while maintaining an aesthetic appeal.

c. As apparent from the table of FIG. 8, when the protective layer for the ornamental plating layer 9 includes a first layer using an acrylic silicone material and a second layer including an acrylic urethane material, the ornamental plating layer 9 resists corrosion while maintaining an aesthetic appeal in a preferable manner. Further, when the one-component curing protective layer 13 has a thickness of 10 to 30 micrometers and the two-component curing protective layer 14 has a thickness of 20 to 30 micrometers, the ornamental plating layer 9 resists corrosion while maintaining an aesthetic appeal in a further preferable manner.

d. The annular wall 12 is arranged in the peripheral portion of the seat 3. When fixing the emblem body 4 with the adhesive member 5 to the seat 3, the peripheral portion of the adhesive member 5 is entirely pressed under pressure by the wall 12. This ensures the sealing of the gap 10 formed between the seat 3 and the emblem body 4 when the emblem body 4 is attached to the seat 3. Thus, even when liquid (water, washing agent, or the like) collects at the surrounding of the exterior emblem 2, the liquid does not enter the gap 10, and fluid does not come into contact with the ornamental plating layer 9. Accordingly, the corrosion resistance of the ornamental plating layer 9 may be maintained.

More specifically, when the emblem body 4 is attached by the adhesive member 5 to an attachment location such as the seat 3, a crease may form in the adhesive member 5. When the adhesive member 5 includes a crease, fluid may enter the gap 10 between the emblem body 4 and the seat 3. In such a case, fluid may come into contact with the ornamental plating layer 9 and erode the ornamental plating layer 9. To prevent such erosion of the ornamental plating layer 9, a drain may be formed under the adhesive member 5 to drain liquid. However, this may not obtain a sufficient draining effect depending on the design of the exterior emblem 2. Thus, the ornamental plating layer 9 would still not have sufficient corrosion resistance.

In contrast, the waterproof structure 11 of the present embodiment seals the gap 10 formed between the emblem body 4 and the seat 3 (attachment location). Thus, even when fluid collects in the surrounding of the emblem body 4, the fluid does not enter the gap 10. Since the fluid does not reach the inner surface of the ornamental plating layer 9, the corrosion resistance of the ornamental plating layer 9 can be maintained.

It should be apparent to those skilled in the art that the present invention may be embodied in many other specific forms without departing from the spirit or scope of the invention. Particularly, it should be understood that the present invention may be embodied in the following forms.

The emblem body 4 does not have to be disk-shaped and may be, for example, tetragonal or have the shape of a true circle.

The adhesive member 5 is not limited to a double-sided adhesive tape and may be, for example, an adhesive resin.

The attachment of the emblem body 4 is not limited to a structure that uses a double-sided adhesive tape. For example, the emblem body 4 may be snap-fitted to the vehicle body.

The first protective layer does not have to use a one-component curing material (acrylic silicone) and other materials may be used instead. Further, the second protective layer does not have to use a two-component curing material (acrylic urethane) and other materials may be used instead.

The wall 12 of the waterproof structure 11 does not have to be annular and arranged entirely along the peripheral portion of the emblem body 4. For example, the waterproof structure 11 may include an open lower portion.

The waterproof structure 11 is not necessarily required and may be eliminated. Alternatively, more than one waterproof structure 11 may be used.

The attachment location is not limited to the seat 3 and may be any location on the vehicle body.

The ornamental plating layer 9, the one-component curing protective layer 13, and the two-component curing protective layer 14 do not have to be formed entirely on the inner surface of the emblem body 4 and may be formed on one part of the inner surface of the emblem body 4.

Any of various processes may be employed to form the emblem layer 8, the ornamental plating layer 9, the one-component curing protective layer 13, and the two-component curing protective layer 14.

The thickness of the one-component curing protective layer 13 and the thickness of the two-component curing protective layer 14 are not limited to the values of the above embodiment and may be varied when necessary.

When forming the two-component curing protective layer 14, the heating process may be eliminated. As long as a reaction occurs with the base compound, the curing agent, and the solvent, the two-component curing protective layer 14 may be formed in any manner.

The exterior emblem 2 is not limited to vehicles and may be used for other apparatuses or devices.

The present examples and embodiments are to be considered as illustrative and not restrictive, and the invention is not to be limited to the details given herein, but may be modified within the scope and equivalence of the appended claims.

The invention claimed is:

1. An exterior sign comprising:
    a main body including a design;
    a plating material arranged on an inner surface of the main body, wherein the plating material is visible through the main body; and
    a double-layered protective layer arranged on the plating material, wherein the double-layered protective layer includes a first protective layer and a second protective layer, wherein
        the first protective layer is formed from a one-component curing material, which is a resin material of a mixture of a base compound and a solvent, and arranged closer to the plating material than the second protective layer and has a lower level of contractility than the second protective layer, and
        the second protective layer is formed from a two-component curing material, which is a resin material of a mixture of a base compound, a curing agent, and a solvent, and has a higher level of corrosion resistance than the first protective layer.

2. The exterior sign according to claim 1, wherein the first protective layer is formed from an acrylic silicone, and the second protective layer is formed from an acrylic urethane.

3. The exterior sign according to claim 1, further comprising:
    an adhesive member that fixes the main body to an attachment location; and
    a waterproof structure including an annular wall arranged on the attachment location along a peripheral portion of the main body, wherein when the main body is fixed to the attachment location by the adhesive member, the wall holds a peripheral portion of the adhesive member under pressure, thereby preventing fluid from entering a gap formed between the main body and the attachment location.

4. The exterior sign according to claim 1, wherein the first protective layer has a thickness of 10 to 30 micrometers, and the second protective layer has a thickness of 20 to 30 micrometers.

* * * * *